Jan. 11, 1949. J. W. JENSEN 2,458,783
CONSTANT REFERENCE POINT MANOMETER
Filed Feb. 18, 1946

INVENTOR.
JOSEPH W. JENSEN
BY
ATTORNEY

Patented Jan. 11, 1949

2,458,783

UNITED STATES PATENT OFFICE 2,458,783

CONSTANT REFERENCE POINT MANOMETER

Joseph W. Jensen, Los Angeles, Calif., assignor to Socony-Vacuum Oil Company, Incorporated, New York, N. Y., a corporation of New York Application February 18, 1946, Serial No. 648,324

1 Claim. (Cl. 73—401)

My invention relates to manometers, and more particularly to manometers applicable for use in flowmeters.

It is well known that the differential between two pressure zones may be observed by reading the liquid levels in the two arms of a partially filled U-tube or similar receptacle. But manometers employing this principle suffer the disadvantage that two simultaneous readings are required, which necessitates the use of additional personnel and increases the possibility of error. This disadvantage has been overcome in certain cases by making the manometer tubes exactly uniform in cross-sectional area, so that one reading suffices for determining both liquid levels, and in other cases by making one side of the manometer relatively very large, so that the variations of liquid level in that side are negligible. However, both of these improvements depend on the maintenance of a constant quantity of liquid in the manometer. Frequently this is not possible because of evaporation, leakage, and the blowing of liquid out of the manometer by occasional excessive pressure differentials, all of which produce a cumulative error.

An object of my invention is to provide a manometer having an accurately and permanently fixed reference level.

Another object of my invention is to provide a manometer suitable for use in multiple with a common high-pressure source, as, for example, in a flowmeter for metering a common fluid to several different points.

Further objects and advantages of my invention will be apparent from the detailed description hereinafter presented, and from the accompanying drawing, in which.

Figure 1:
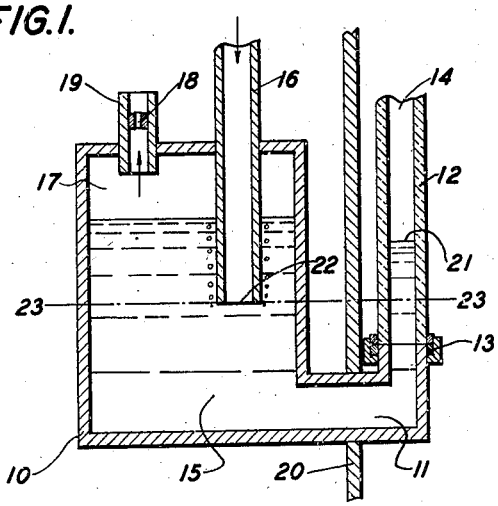
Fig. 1 is a cross-sectional view of a manometer embodying the invention.

Referring particularly to Fig. 1, 10 is a vessel, closed except for the apertures shown and hereinafter described, communicating by means of passage 11 with the lower end of a vertical transparent tube 12. The junction at the lower end of tube 12 is sealed as by packing 13, and the upper end of the tube is exposed to one of the pressure zones to be measured as at 14. This is normally but not necessarily the low-pressure zone.

A body of liquid 15, which may be oil, water, mercury, or virtually any other liquid depending on the nature and temperature of the fluid being observed and the degree of pressure differentials expected, is contained in vessel 10 and also extends through passage 11 into tube 12.

Fluid from the high-pressure zone, typically a gas, is introduced into vessel 10 by means of tube 16 which has its open end immersed in body of liquid 15. The fluid bubbles up through the liquid into space 17 in the upper portion of vessel 10. This space is vented through a narrow orifice 18 in discharge connection 19. The discharge may be to the atmosphere, to a trap for recovery of fluid, or elsewhere, but in any case must be to a pressure considerably less than the minimum pressure expected to occur within tube 16 during operation.

The whole may be mounted on a panel 20, which serves as a background to facilitate reading liquid level 21 in tube 12.

The operation of this device depends upon the maintenance at the end of tube 16 of a substantially fixed interface 22 between the manometer liquid and the fluid being observed, which establishes level 23—23 as the constant reference level. This is accomplished automatically, as orifice 18 maintains a back pressure in space 17 which, together with the head of manometer liquid in vessel 10 and above level 23—23, accurately balances the pressure within tube 16. There may be momentary fluctuations in the position of interface 22, associated with changes of pressure, but these are quickly corrected and may be regarded as merely adding an inconsequential amount to the time lag displayed by the manometer in responding to abrupt changes of pressure. Thus the height of the column of manometer liquid in tube 12 above level 23—23 may be taken as an accurate measure of the pressure differential under observation.

Within broad limits, it is essential that the capacity of orifice 18 be properly chosen. Consider the effect of an abrupt decrease of pressure within tube 16. The first response is a rise of the interface 22 into tube 16, which may be sufficient in degree to render the manometer temporarily inaccurate. This cuts off the flow of fluid into vessel 10, but fluid continues to escape through orifice 18, reducing pressure in space 17 until interface 22 falls to its proper position on level 23—23, reestablishing flow of fluid into the vessel. It is thus apparent that the time required to restore equilibrium after a fall of pressure varies inversely with the capacity of orifice 18, and that, if the orifice be too small, a manometer becomes generally inaccurate under conditions of decreasing pressure.

Consider now the effect of an abrupt rise of pressure within tube 16. Interface 22 falls somewhat below the end of tube 16, and an appreciable portion of the back pressure exerted on the flowing fluid is due to the inertia and viscosity of the manometer liquid. This, likewise, may render the manometer temporarily inaccurate. Fluid now flows into vessel 10 at an increased rate while it escapes through orifice 18 at a substantially unchanged rate. Thus pressure builds up in space 17 until equilibrium is restored, and the time required to accomplish this varies directly with the capacity of orifice 18. It is evident that, if the orifice be made too large, the manometer becomes generally inaccurate under conditions of increasing pressure.

An optimum size for the orifice may be determined, if desired, in the following manner. During the operation of a particular installation, there may be expected to be certain more or less abrupt changes in pressure such as would be attendant upon the opening, closing, or adjustment of a valve somewhere in the system. Choose a pressure differential approximating in magnitude the greatest of such expected changes, and determine by experiment the rate of flow through tube 16 when the chosen differential exists between the interior of the tube and a point in vessel 10 on level 23—23. Then orifice 18 should be so proportioned as to have a capacity of approximately half this rate of flow when subjected to the pressure expected in operation. This causes the manometer to recover equilibrium in about an equal length of time whether the pressure rises or falls.

In practice such refinement is not necessary, as wide variation from the optimum is permissible without appreciably affecting the accuracy of the device. In one particular installation, where the fluid being observed is a mixture of air, nitrogen, and carbon dioxide having gauge pressures in the vicinity of ten pounds per square inch, the inside diameter of tube 16 is 0.36 inch, and the manometer liquid is a petroleum fraction of the gas-oil type having a viscosity of 30 seconds S. U. at 100° F., the orifice is a drilled hole of .028 inch diameter and ⅜ inch in length. Similar orifices will be found satisfactory except in extreme examples.

In most applications the fluid under observation will be a gas, but the device described is also suitable for use with liquids, provided only that the manometer liquid is immiscible with the liquid being observed and of substantially greater density. The incompressibility of liquid in space 17 modifies the operating characteristics of the manometer but it does not alter the structure or the method of use.

Figure 2:
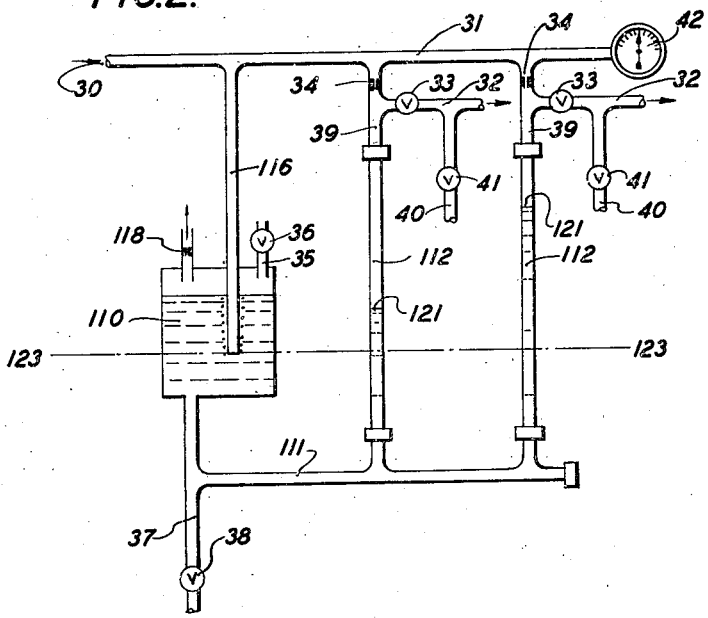
Fig. 2 is a diagrammatic representation of a multiple flowmeter employing the invention.

Fig. 2 diagrammatically illustrates a multiple flow-meter employing the present invention. Features analogous to those shown in Fig. 1 are represented by an analogous reference numerals. Fluid from a source not shown is introduced at 30 and conducted to a plurality of reactors by means of main line 31 and subsidiary lines 32—32, each of the lines 32—32 being provided with a control valve 33. Between the main line and each subsidiary line is interposed a metering orifice 34.

Fluid from main line 31 is conducted by line 116 into manometer vessel 110, in which a constant reference level 123—123 is established in the manner described above. Vessel 110 is provided with a filling connection 35 normally closed by valve 36 and with a drain connection 37 normally closed by valve 38, so that the manometer liquid can be removed, replenished, or changed. Immediately downstream of each orifice 34 is provided a connection 39 communicating with the upper end of one of the transparent manometer tubes 112—112. The lower ends of tubes 112—112 are connected with vessel 110 by means of line 111.

Since line 116 communicates with the pressure zone upstream of orifices 34—34 and each of the tubes 112—112 communicates with the pressure zone downstream of one of orifices 34—34, the height of each of the liquid levels 121—121 above constant reference level 123—123 indicates the pressure drop, and therefore the rate of fluid flow, through the associated orifice 34. The manometer tubes may be graduated with a linear scale to indicate pressure differentials or with a non-linear scale to be read directly in terms of rate of flow.

At times one or more of the pressure differentials may accidentally be permitted to rise above the intended maximum, as a result of which a small amount of manometer liquid may be forced into one or more of the lines 32—32. In order that such liquid may be trapped and eventually drained off, lines 32—32 are provided with downwardly directed connections 40—40 controlled by normally closed valves 41—41. A pressure gauge 42 may be connected to main line 31 in order to observe the pressure of the fluid supply.

I claim as my invention:

A differential manometer comprising: a tube having lower and upper ends, said tube being open at its upper end to a zone of pressure to be measured; a vessel provided in its upper portion with an outlet and provided below its upper portion with a downwardly facing inlet and with a connection with the lower end of said tube, said vessel being otherwise closed; means for conducting to said inlet fluid from another zone of pressure to be measured; a body of liquid in said tube, in said vessel, and in the connection therebetween, completely filling said connection and filling said vessel to a level above said inlet; and a restriction in said outlet having an orifice of such capacity as to cause a substantially fixed interface between said liquid and said fluid to be maintained at said inlet.

JOSEPH W. JENSEN.

REFERENCES CITED

The following references are of record in the file of this patent:

UNITED STATES PATENTS

| Number | Name | Date |
|---|---|---|
| 2,288,505 | Wetteland | June 30, 1942 |

FOREIGN PATENTS

| Number | Country | Date |
|---|---|---|
| 428,704 | France | June 28, 1911 |